Jan. 8, 1952     F. P. MARTIN     2,582,142
FLUID POWER STEERING GEAR FOR SWINGING AXLES
Filed March 28, 1949     5 Sheets-Sheet 1

Inventor
Fred P. Martin
By
Fishburn & Mullendore
Attorneys

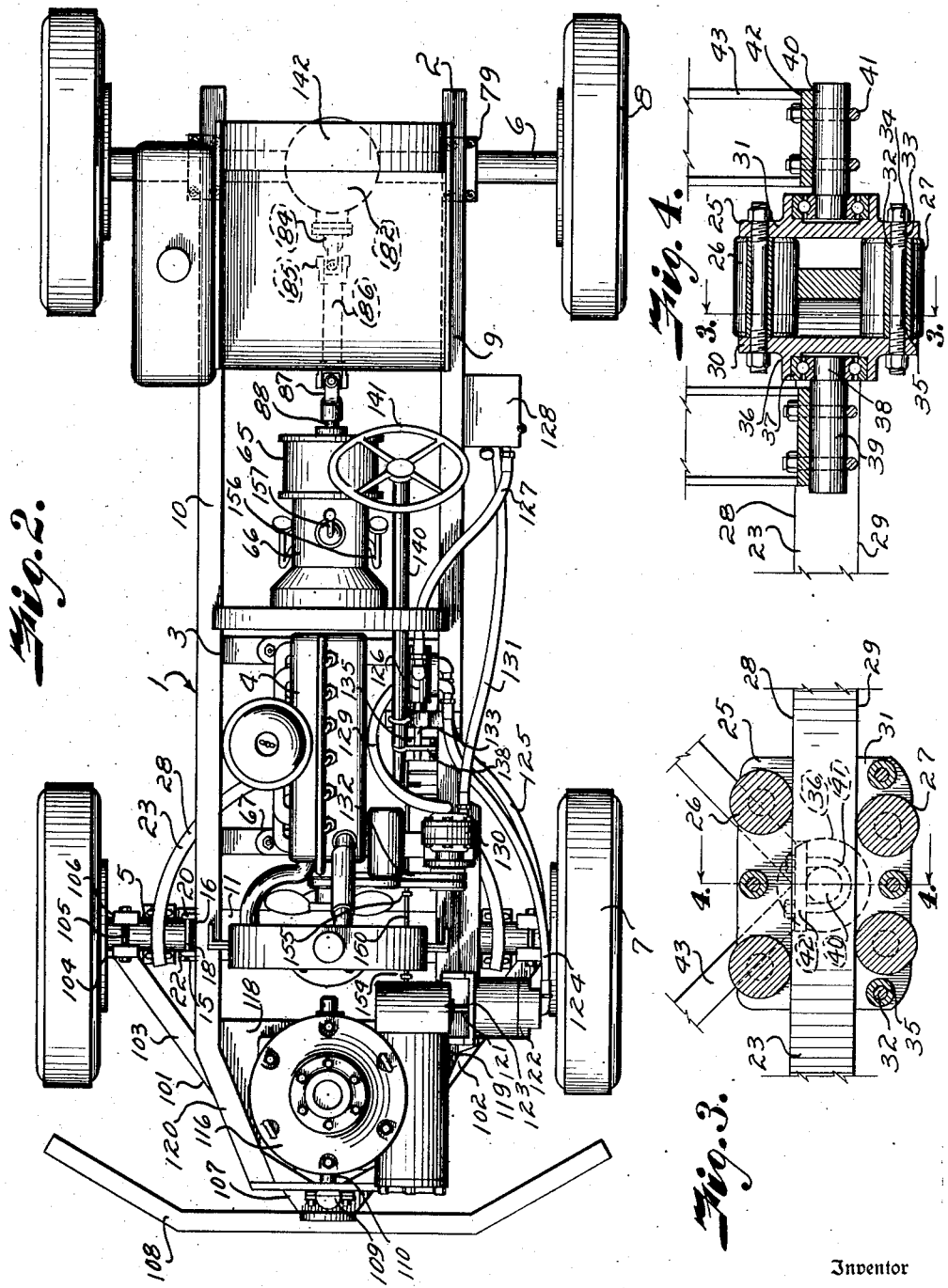

Jan. 8, 1952 — F. P. MARTIN — 2,582,142
FLUID POWER STEERING GEAR FOR SWINGING AXLES
Filed March 28, 1949 — 5 Sheets-Sheet 3
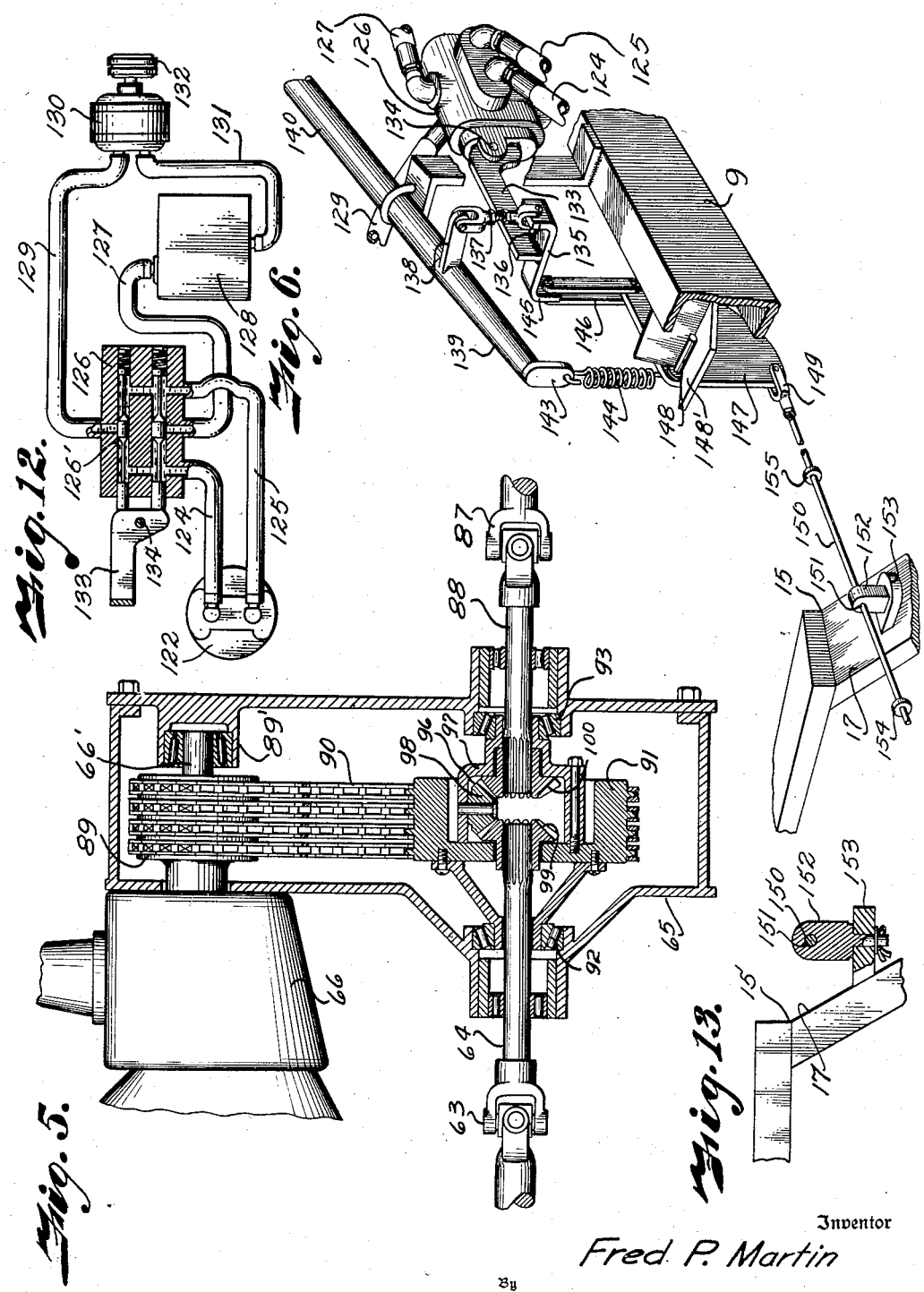
Inventor
Fred P. Martin
By Fishburn & Mullendore
Attorneys

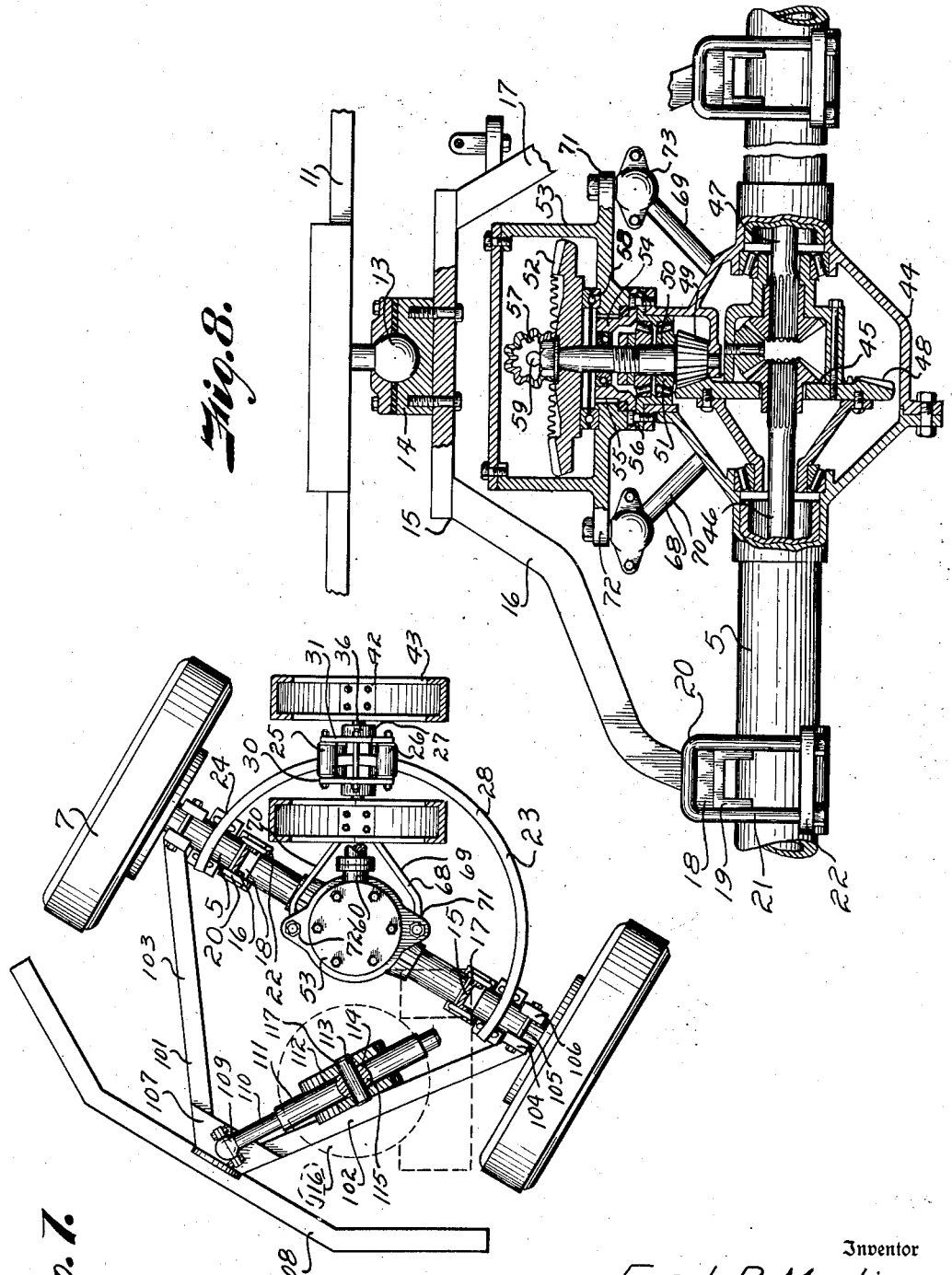

Jan. 8, 1952 F. P. MARTIN 2,582,142
FLUID POWER STEERING GEAR FOR SWINGING AXLES
Filed March 28, 1949 5 Sheets-Sheet 5
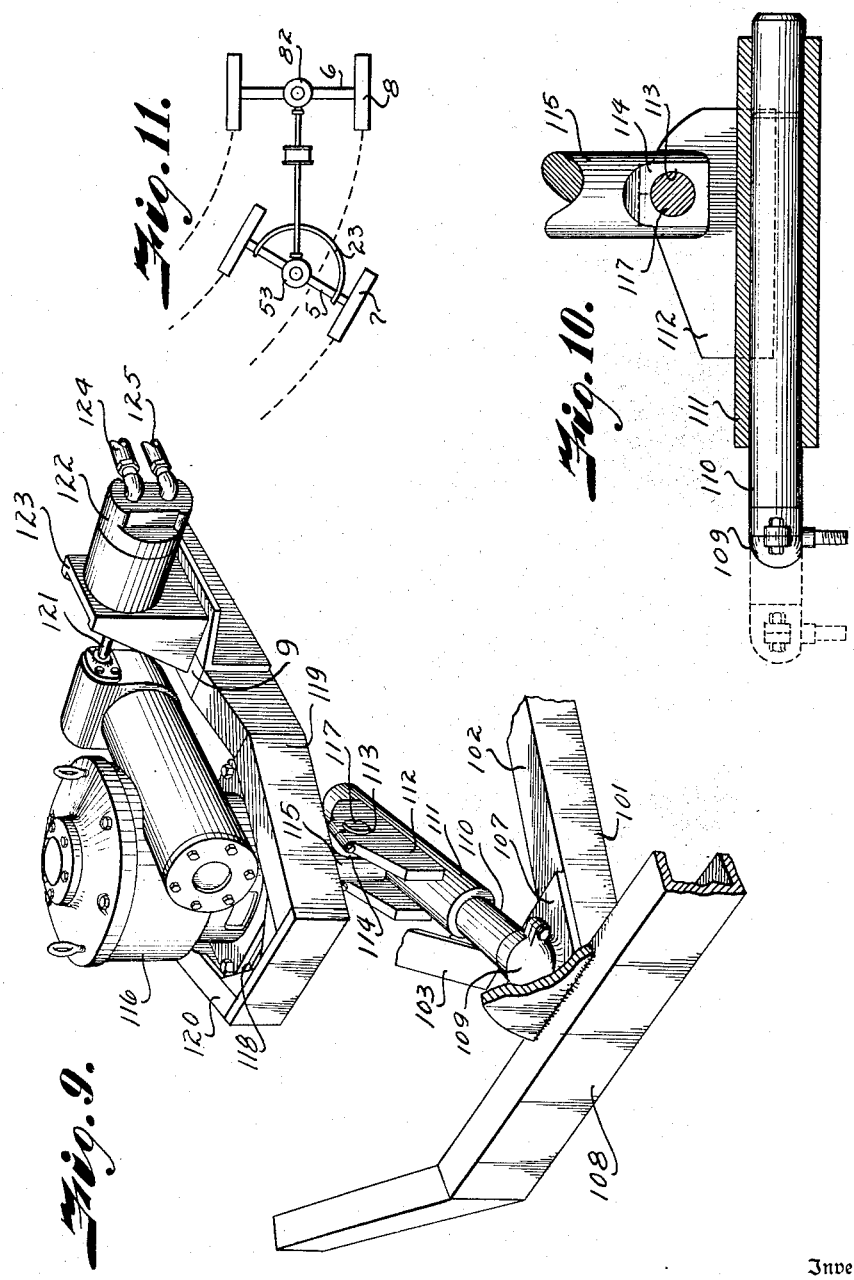
Inventor
Fred P. Martin
By
Fishburn + Mullendore
Attorneys Patented Jan. 8, 1952

2,582,142

UNITED STATES PATENT OFFICE 2,582,142

FLUID POWER STEERING GEAR FOR SWINGING AXLES

Fred P. Martin, Topeka, Kans.

Application March 28, 1949, Serial No. 83,914

5 Claims. (Cl. 180—79.2)

This invention relates to power operated vehicles such as tractors having multiple axles and more particularly to such a vehicle in which driving power is delivered from the engine to all of the road engaging wheels and an axle turned by power for steering, said invention being adapted for use on wheels having a driving axle and mounting for turning of same for steering such as is disclosed in my copending application, Serial No. 758,151, filed June 30, 1947.

The objects of the present invention are to provide an all wheel driven tractor wherein the power is transmitted through gear reductions and conventional differential structures which may be repaired and maintained by the ordinary mechanic; to provide an all wheel driven vehicle giving increased traction and pulling power and having an axle turned by power for steering with increased maneuverability; to provide an hydraulically driven gear reduction steering mechanism for easy, safe and positive control of the turning and positioning of the steering axle; to provide a vehicle with a driving axle having limited universal or swinging movement on said vehicle whereby the traction wheels may assume different elevations relative to said vehicle in passing over uneven ground and permit the axle to be turned to steer the vehicle; to provide a driving axle with spaced supporting connections on a vehicle, said connections being spaced from said axle and at different elevations and angles from the axis of said axle for pivoting the driving axle on the vehicle about a vertical axis, one of said supports including a series of oscillating rollers permitting swinging movement of said axle; to provide mechanism for transmitting power from the engine of the vehicle to a connection on the turntable axle for turning same regardless of the elevation of the traction wheels or other swinging and pivotal movement of said axle; to provide limit controls for limiting the turning movement of the steering axle; to provide an all wheel driven vehicle having an axle turned by power for steering, said wheels being driven through the combination of differential structures between the wheels and between the drives for the respective axles; and to provide an all wheel driven vehicle having an axle turned for steering that is capable of easy maneuvering, short turning radius, high traction efforts, flexibility of operation on all types of terrain, positive in steering and efficient, sturdy and economical to operate and maintain.

In accomplishing these and other objects of the present invention, I have provided improved details of structure, the preferred forms of which are illustrated in the accompanying drawings, wherein:

Fig. 2 is a plan view of the chassis of the tractor.

Fig. 3 is a vertical sectional view on the line 3—3, Fig. 4, through the oscillating roller support for the front axle.

Fig. 4 is a vertical sectional view on the line 4—4, Fig. 3, illustrating the pivotal mounting of the oscillatable roller support.

Fig. 5 is a detail sectional view through the power transmission mechanism for delivering power from the engine to the drive shafts.

Fig. 6 is a detail perspective view of the controls for the steering of the vehicle.

Fig. 7 is a horizontal sectional view through the forward end of the vehicle, particularly illustrating the axle connecting and supporting members, and axle steering connection.

Fig. 8 is a vertical sectional view of the front axle mounting, portions of said mounting, gear reduction and differential gearing being broken away to better illustrate the parts therein.

Fig. 9 is a perspective view of the power steering mechanism.

Fig. 10 is a vertical sectional view through the universal power connection on the steering mechanism.

Fig. 11 is a diagrammatic view illustrating the position of the wheels and axles when turned as in negotiating a curve.

Fig. 12 is a diagrammatic view illustrating the valve and connections for controlling operation of the power steering motor.

Fig. 13 is a sectional view through the front axle yoke showing the mounting of the limit control ear thereon.

Figure 1:
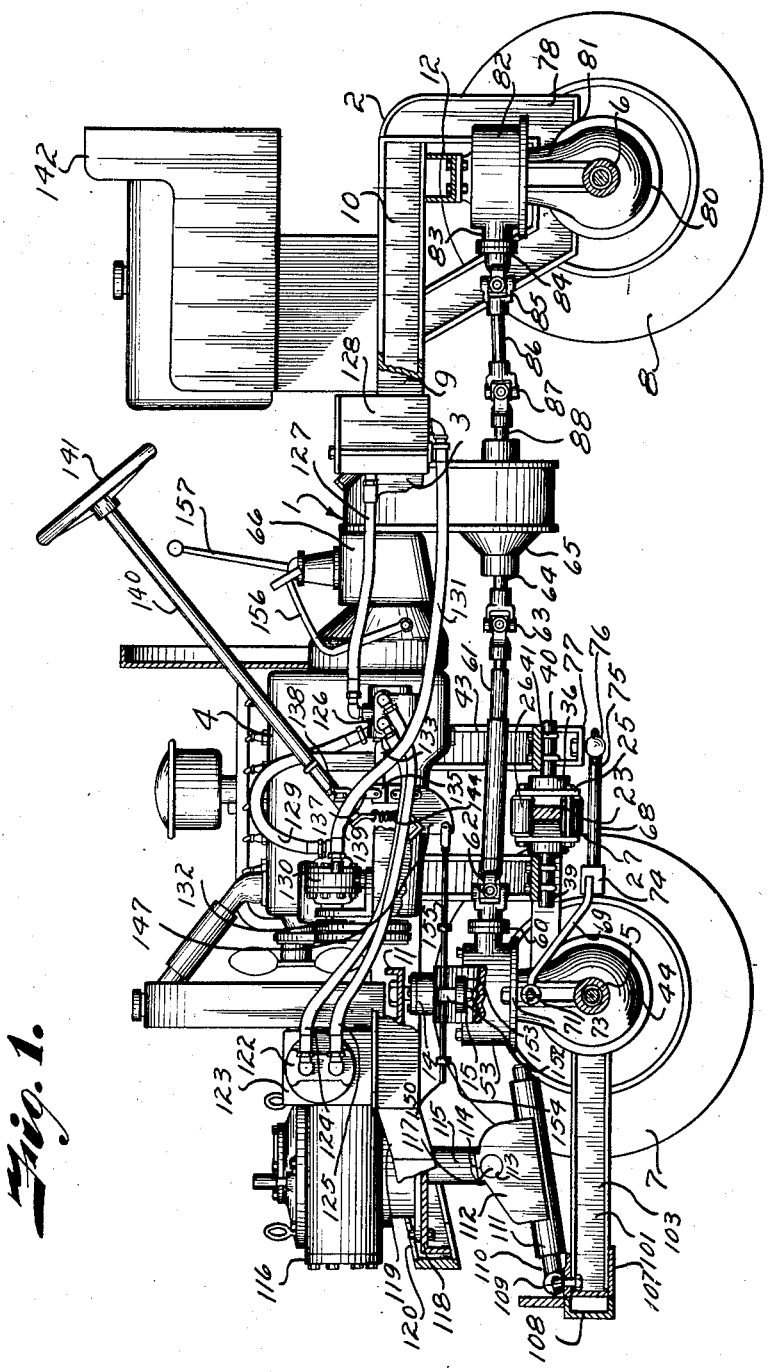
Fig. 1 is a side elevation of a vehicle embodying the features of the present invention having the body and hood removed and portions broken away to better illustrate the parts therein.

Referring more in detail to the drawings:

1 designates a motor vehicle such as a tractor having a chassis 2 supported on a plurality of axles. In the form of the invention illustrated the chassis consists of a frame 3 carrying an engine 4 preferably in the forward portion thereof. The frame is supported on a front axle housing 5 and rear axle housing 6, the axles being carried by wheels 7 and 8 respectively. The frame 3 consists of spaced channel members 9 and 10 arranged longitudinally of the vehicle and connected adjacent their front and rear ends by transverse channel members 11 and 12 respectively, the ends of which are suitably connected as by welding or the like to the longitudinal channel members, said longitudinal members also being connected by other transverse members or suitable bracing to provide a rigid frame structure.

The axles 5 and 6 conform to well known design of commercial automobile or truck rear axles except for slight alterations and additions as become necessary to adapt the same for the use herein exemplified. No brake mechanism is illustrated as such mechanism may be conventional and forms no part of the invention.

Depending from the channel member 11 and preferably centrally arranged relative to the longitudinal channels 9 and 10 is a ball member 13 universally rotative in a spherical socket member 14 suitably secured to the upper portion of an A-frame or yoke 15, said A-frame having outwardly and downwardly directed legs 16 and 17, the lower ends of which are provided with feet 18 adapted to rest on suitable pads 19 mounted on the upper portion of the axle housing 5. The feet 18 are secured to the axle housing and the pads 19 thereon by means of U-bolts 20 engaging over the upper portion of the feet and having legs 21 extending downwardly therefrom and through suitable apertures in a plate 22 extending under the axle housing 5, nuts being applied to the ends of the U-bolt legs for drawing the plate 22 into snug engagement with the axial housing 5.

In order to stabilize the universal action of the front axle housing mounting and particularly to eliminate longitudinal movement of said housing relative to the vehicle, an arcuate member 23 is arranged substantially in a plane at right angles to the vertical axis extending through the ball and socket members 13 and 14. The arcuate member 23 preferably consists of a heavy, flat bar or other suitable structural shape, bent in the form of a semicircle and having its ends secured as at 24 to the axle housing 5 by means of suitable U-bolts and plate structure similar to that for anchoring the A-frame or yoke 15 to said housing. The ends of the semicircular member 23 are preferably secured to the axle housing near the wheels 7 and extend to the rear of said axle housing 5, the arcuate member extending through a support structure 25 which permits the arcuate member to move when the housing 5 is turned about a vertical axis and permits lateral oscillation of said axle housing and arcuate member as when the wheels pass over uneven terrain.

The support 25 preferably consists of a series or rollers mounted on the frame for oscillation about an axis perpendicular to the vertical axis extending through the ball and socket members 13 and 14. More particularly the support 25 consists of suitable rollers 26 and 27 having rolling engagement with the upper and lower edges 28 and 29 of the arcuate member 23 and rotatably mounted in spaced plates 30 and 31, said plates being held in suitably spaced relation by means of studs 32 extending through apertures 33 in said plates and having nuts 34 threaded on the ends of said studs to draw the plates together and into engagement with suitable spacers 35 arranged on the studs between the plates. Each of the plates is provided with a boss 36 having suitable antifriction bearing 37 mounted in a bore in said boss, said bearings 37 being mounted on ends 38 of stub shafts 39 and 40, secured by means of U-bolts 41 to the lower ends 42 of suitable bracing 43 carried on the longitudinal frame members 9 and 10. The stub shafts 39 and 40 are preferably arranged in parallel relation to the longitudinal center of the frame 3 whereby the bearings 37 permit rotative movement of the plates 30 and 31 in a vertical plane transversely arranged relative to the vehicle frame 3.

This structure prevents upward or downward movement of the rear portion of the arcuate member 23, thereby preventing movement of the axle housing 5 longitudinally of the vehicle. It does provide for lateral movement simultaneously with the turning movement of the axle housing about the ball and socket members 13 and 14 and thereby providing for suitable movement of the axle housing 5 when the wheels 7 pass over uneven ground.

The axle housing 5 includes a differential gear housing 44 enclosing conventional differential gearing 45 operatively connected to axles 46 and 47 extending through the axle housing 5 and operatively connected with the wheels 7. The differential gearing includes a conventional ring gear 48 meshing with a beveled pinion 49 fixed on a driveshaft 50 rotatably mounted in suitable bearings 51 carried in a vertically arranged extension of the housing 44 whereby the shaft 50 is on a vertical axis extending through the ball and socket members 13 and 14. The upper end of the shaft 50 carries a ring gear 52 enclosed in a housing 53 which is supported on a bushing 54 by roller bearings 55, said bushing having a flange 56 secured by suitable fastening devices such as screws to the extension of the differential housing 44. This structure permits the housing 53 and the axle housing 5 to have relative rotation. The beveled gear 52 meshes with a beveled pinion 57 and any thrust imparted by the beveled pinion to the beveled gear is taken by thrust bearings 58 between the gear 52 and the lower part of the gear housing 53.

The beveled pinion 57 is mounted on a shaft 59 which is carried in suitable bearings in a housing extension 60 projecting rearwardly of the housing 53 and arranged perpendicular to the axis of the shaft 50. The rear end of the shaft 59 is suitably connected to a drive shaft 61 by means of a suitable universal joint 62. The drive shaft 61 preferably consists of telescoping keyed members to provide extension and contraction of the drive shaft 61. The rear end of the driveshaft 61 is connected by a universal joint 63 with a shaft 64 extending forwardly from adjacent the lower end of a housing 65 enclosing suitable transmission mechanism such as chains, sprockets and gears operatively engaged to receive driving power from the conventional transmission enclosed in the housing 66 mounted on the rear of the engine 4, which is suitably supported on the frame members 9 and 10 as at 67. This arrangement connects the engine as later described with the differential gearing in the axle housing 5 to deliver power thereto with the shaft 61 substantially horizontally arranged and in parallel relation with the frame members 9 and 10.

Since the axle housing 5 is rotatable about a vertical axis extending through the shaft 50 and is rotatable relative to the housing 53, said housing 53 may be held against rotation relative to the chassis by means of a wishbone connection 68 with the frame. Said wishbone arrangement consists of arms 69 and 70, the forward ends of which are connected to ears 71 and 72 extending laterally of the housing 53 by means of ball and socket devices 73. The arms 69 and 70 converge and are connected by a collar 74 slidable and rotatable on a shaft 75, the rear end of which is connected by a ball and socket connection 76 mounted on the lower end of a bracket 77 which is secured to the rearmost brace 43. The wishbone structure permits free oscillatory movement of the axle housing on the ball and socket members 13 and 14, but maintains the gear housing extension 60 substantially in alignment with the shaft 64 of the transmission housing 65.

The rear portions of the longitudinal frame members 9 and 10 are connected by the transverse member 12 and each of the longitudinal members is provided with downwardly extending suitably braced legs 78, the lower ends of which are secured to the axle housing 6 by plates and bolts 79 to rigidly fix the rear axle housing 6 transversely of the frame 2. The axle housing 6 includes a gear housing 80 for enclosing suitable differential gearing substantially the same as conventional automotive beveled gear differential structure and the same as the differential structure enclosed in the housing 44 of the front axle housing. The housing 80 is provided with a vertically arranged extension 81 on which is secured a housing 82 enclosing a beveled gear having meshing engagement with a beveled pinion in the same manner as the gear and beveled pinion in the housing 53, said beveled pinion being carried in suitable bearings in a housing extension 83 arranged forwardly of the housing 82 and substantially coaxial with the shaft 64 in the transmission housing 65. The shaft 84 is connected by means of a universal joint 85 with a drive shaft 86, the forward end of said drive shaft being connected by a universal joint 87 with a shaft 88 extending rearwardly from adjacent the lower end of the housing 65 and coaxial with the shaft 64, the shaft 88 receiving power from the transmission mechanism to deliver power of the engine to the differential gearing in the houing 80 of rear axle housing 6, said differential gearing being connected in a conventional manner with the wheels 8 for driving same and permitting said wheels to rotate at different speeds as when the vehicle is turning or negotiating an arcuate path.

The housing 65 is suitably secured to the transmission housing 66 and encloses transmission mechanism as illustrated in Fig. 5. A driven shaft 66' extends from the rear of the transmission housing 66, the end of said shaft being rotatably supported in a beairng 89' carried in the housing 65. Keyed to the shaft 66' is a sprocket 89 having driving engagement with a chain 90 which engages and drives a sprocket 91 rotatably mounted in bearings 92 and 93 which rotatably mount the shafts 64 and 88 respectively. Carried by the sprocket 91 is a suitable differential gearing 96 consisting of a spider 97 carrying beveled pinions 98 meshing with beveled gears 99 and 100 keyed to the adjacent ends of the shafts 64 and 88 respectively. While chains and sprockets have been illustrated and described, obviously any suitable arrangement of gears or other conventional transmission equipment may be used which will deliver driving power to the shafts 64 and 88 with a differential action therebetween.

The differential mechanism 96 provides for differential speeds of rotation of the shafts 64 and 88 and between the front and rear axle, thereby assuring proper driving contact with the ground by each wheel when the tractor is negotiating curves and the mean speed of rotation of the front wheels is different than the mean speed of rotation of the rear wheels.

The structure thus far described provides for delivery of power from the engine to each of the wheels 7 and 8 for propelling the vehicle and the axle housing 5 is mounted on the chassis in such a manner that said axle may turn to steer the vehicle as when the vehicle is negotiating a curve. In order to control such turning to provide for steering of the vehicle, the axle is provided with a tongue 101 illustrated as being formed by channel members 102 and 103 having feet 104 secured to the axle housing 5 by suitable bolts 105 extending through apertures in the feet 104 and plates 106 on the opposite side of said axle housing. The feet 104 are secured to the axle housing adjacent the wheels 7, the channel members 102 and 103 extending forwardly of the axle and converging, the free ends being connected by suitable plaes 107 or the like welded thereon. It is preferable that the tongue structure be relatively strong and the forward end thereof provided with a suitable member 108 forming a bumper which extends outwardly in front of the wheels 7. It is preferable that the actual steering be done by power mechanism and in the illustrated structure the plate 107 supports a ball and socket joint 109 providing a swivel connection with a cylindrical bar 110 extending to the rear of the ball and socket joint and rotatably and slidably mounted in a sleeve 111. Secured to the sides of the sleeve are upwardly extending plates 112 forming spaced ears having bearing openings 113 adapted to align with an aperture in a flattened end 114 of a shaft 115 extending downwardly from a gear reduction unit 116. A suitable bearing pin 117 extends through the apertures in the ears and in the shaft end 114 to provide for rotation of the sleeve 111 and the bar 110 therein about a horizontal axis formed by the pin 117.

The gear reduction unit 116 may be of any suitable form but preferably is a double worm gear reduction and is supported on a suitable plate 118 or the like having its ends secured to extensions 119 and 120 of the longitudinal frame members 9 and 10 to provide a rigid, sturdy support for the gear reduction unit. The use of a double worm gear reduction unit prevents shocks on the wheels from changing the relative position of the axle housing 5 and the frame, whereby any change of the arc of turn of the vehicle must be in response to power applied under control of the operator. Power is applied to the input shaft 121 of the gear reduction unit, said shaft being connected to an hydraulic motor 122 supported by a suitable bracket 123 on the frame member 9. The hydraulic motor is connected to and has communication with tubes or ducts 124 and 125 and is so constructed that when fluid is applied through one of the tubes the hydraulic motor rotates the shaft 121 in one direction, and when fluid is applied through the other tube the hydraulic motor rotates the shaft 121 in the other direction, thereby providing a reversing drive for the gear reduction unit 116. The opposite ends of the tubes 124 and 125 are connected to a control valve 126, said valve also having connection by means of a tube 127 to a fluid reservoir 128 and by a tube 129 connected to the discharge of an hydraulic pump 130, the intake of said pump being connected by a tube 131 with the reservoir 128.

The pump 130 is suitably secured to the frame member 9 and is driven by belts 132 from the engine 4, the pump preferably having a built-in bypass designed to open at a predetermined pressure. The pump draws fluid from the reservoir 128 through the tube 131 and pumps said fluid through the tube 129 to the valve 126, said valve being of conventional structure having two valve plungers which, when in neutral position, close all intake and outlet ports, the valve plungers being controlled by a lever 133 pivoted as at 134 on the valve body and having portions contacting the extending ends of the valve plungers whereby movement of the lever 133 in an upward direction, as shown in Fig. 6, pushes one of the valve plungers inwardly and allows the other to move outwardly, opening passages in the valve whereby fluid from the pump flows from the tube 129 through the valve and through the tube 124 to the hydraulic motor 122 to revolve same in a clockwise direction Fig. 1, discharge from the motor 122 flowing through the tube 125, through the valve and tube 127 to the reservoir 128. Downward movement of the lever 133 reverses the position of the valves whereby fluid flows from the tube 129, through the control valve and tube 125 to the hydraulic motor and the return from the motor passes through the tube 124, control valve and tube 127 to the reservoir 128. When the lever 133 is in neutral position, there is no rotation of the shaft 121 by the motor 122 and the pressure in the line 129 is at the predetermined amount to effect instantaneous starting of movement upon the movement of the control lever 133.

The control valve 126 is suitably secured to the frame member 9 in a position whereby the lever 133 extends forwardly thereof, the free end of the lever being secured as by welding to a Z-shaped member 135 having a flange 136 connected by a link 137 to an arm 138 extending laterally from a collar 139 on the lower end of a steering shaft rotatably mounted in the steering column 140, the other end of the shaft carrying the conventional steering wheel 141 adjacent the seat 142 for the operator, the column 140 being suitably secured in the instrument panel and to the frame to provide a rigid support for said column. The collar 139 is provided with an arm 143 on the lower end thereof which preferably extends downwardly and is connected to one end of an extension spring 144, the other end of said spring being connected to a suitable member rigid on the frame whereby the spring tension tends to return the arm 143 to a vertical position which corresponds to a neutral position of the lever 133 at any time when the operator is not applying rotative pressure to the steering wheel 141.

In order to limit turning movement of the axle housing 5, the Z-member 135 has a downwardly turned flange 145 connected by links 146 with a plate 147 rotatably mounted on a shaft 148, said shaft 148 being fixed on a bracket 148' which is suitably secured to the frame member 9. The plate 147 is preferably substantially a quarter of a circle and forms a bell crank by having the links 146 connected adjacent its periphery at one end and a yoke 149 pivotally and loosely connected to the opposite end whereby lines through the pivotal connections of the plate 147 form substantially a right angle at the axis of the shaft 148. Secured to the yoke 149 is a shaft 150 extending through and loosely slidable in an aperture 151 of an ear 152 mounted for rotation about a vertical axis on a flange 153 or other support on the A-frame member 17. The movement of the ear 152 toward and away from the longitudinal center of the vehicle in response to turning movement of the axle housing 5 is relatively small whereby the loose fit of the shaft 150 in the aperture 151 and the loose connection of the yoke 149 prevent binding of said shaft. Secured to the shaft 150 on opposite sides of the ear 152 are collars 154 and 155 so positioned that when the axle is turning and approaching a desired limit the ear 152 engages the respective collar applying force to the shaft 150 to move the plate 147 and return the lever 133 to the neutral position, this force overpowering any force the operator might apply to the steering wheel 141 tending to continue to hold the lever 133 in position to effect the turning operation. For example, when the pump 130 is operated and the steering wheel turned to move the lever 133 upwardly, Fig. 6, causing the fluid to drive the motor 122 and turn the axle to the right, Fig. 2, the ear 152 approaches the collar 154. Before the axle is turned to a predetermined limit the ear 152 engages the collar 154 and continued turning of said axle causes the collar 154 to move with the axle and ear 152, pulling the shaft 150. The force on the shaft 150 overpowers the force the operator applies to the steering wheel whereby the plate 147 is rotated drawing the lever 133 downwardly to neutral position stopping operation of the motor 122 and holding the axle turned to the right to the limit of its movement until the steering wheel is turned to move the lever 133 downwardly for turning the axle to the left.

In operating a device constructed as described the engine 4 is started as in conventional motorized equipment, the clutch pedal 156 operated, the gear shift lever 157 moved to place the power transmission equipment in the proper gear and the clutch pedal let out to engage the clutch as in conventional practice. The power of the engine is delivered through the transmission mechanism in the housing 66 to rotate the sprocket 89 which through chain 90 drives the sprocket 91, rotating the differential mechanism 96. The pinion 98 and beveled gears 99 and 100 transmit the rotation of the differential mechanism and effect differential rotation of the shafts 64 and 88 respectively, thereby driving the drive shafts 61 ad 86 to transmit propelling power through the gearing in the housings 53 and 82 and differential gearing in the housings 44 and 80 to deliver propelling power to the wheels 7 and 8. Through this arrangement power is applied to each of the wheels, making an all wheel drive vehicle which will maintain ground engagement by the wheels when negotiating turns in which each wheel rotates at a different speed due to the different radii of the circles in which the wheels move.

In forward movement of the vehicle over irregular terrain, different relative vertical positions of the rear wheels effect tilting of the frame as the rear axle housing 6 is rigid therewith. The front wheels, however, assume different relative heights without tilting of the frames due to the pivotal connection or oscillation of the plates 30 and 31 carrying the rollers 26 and 27 for stabilizing the arcuate member 23. Therefore the front axle housing 5 may swing about the ball and socket members 13 and 14 in a vertical plane transversely with the longitudinal center of the vehicle and the collar 74, being rotatable and slidable on the shaft 75, maintains the alignment of the gear housing 53 while permitting such swinging motion.

While the engine 4 is operating it is constantly driving the pump 130 drawing hydraulic fluid from the reservoir 128 through the tube 131 and maintaining a predetermined pressure as determined by the bypass arrangement in the pump. When it is desired to turn the vehicle the steering wheel 141 may be turned, for example, to the left, moving the arm 138 downwardly and through the link 137 and Z-member 135 moves the lever 133 downwardly on the pivot 134 to move the valve plungers to permit passage of fluid from the pump through the tube 129, valve body 126, the tube 125 to the hydraulic motor 122, the discharge from said motor returning through the tube 124, through the valve body 126, tube 127 to the reservoir 128. The movement of the hydraulic fluid through the motor 122 effects rotation of the shaft 121 to drive the gears in the gear reduction unit 116 to effect a relatively slow, positive turning of the shaft 115 to positively turn the sleeve 111, bar 110 and through the ball and socket joint 109 move the tongue 101 to the left, turning the axle housing about the vertical axis through the ball and socket members 13 and 14, the housing 44 turning relative to the housing 53 whereby there is no change in the angularity of the drive shaft 61.

Turning movement of the steering wheel 141 swings the arm 143 to the side whereby tension of the spring 144 tends to return the steering wheel to its neutral position. Also the movement of the steering wheel and the lever 133 moves the plate 147 on its pivot shaft 148 to shift the shaft 150 forwardly through the aperture 151 in the ear 152. It is preferable that the valve body 126 and plungers therein be so arranged with tapered portions 126' on the plungers cooperating with the openings for passage of the fluid through the valve body whereby flow of fluid to the motor will increase in proportion to the amount of rotation of the steering wheel 141, the greater the movement of the wheel 141 from neutral position, the greater the amount of fluid delivered to the motor 122. This provides a variable control over the speed of turning movement delivered by the speed reduction unit 116, however, as long as turning pressure is applied to the steering wheel to hold same out of neutral position, turning movement of the axle housing 5 will continue until the ear 152 contacts the collar 155 and then continued movement of the axle applies pressure to the collar 155 to pivot the plate 147 and apply pressure to the arm 133 to return same to a neutral position, this pressure overcoming the pressure applied to the steering wheel by the operator.

Rotation of the steering wheel 141 to the right moves the lever 138 upwardly to effect upward movement of the lever 133 to move the valve plungers in the valve body 126 whereby fluid may flow from the pump through the tube 129, valve body 126, tube 124, to the motor 122, the return of the fluid being through the tube 125, valve body 126, tube 127 to the reservoir 128. This effects a reverse movement through the motor 122 to drive the shaft 121 and effect turning of the shaft 115 to turn the sleeve 111 and ball 109 to the right, drawing the tongue 101 to the right to swing the axle housing 5 about the vertical axis through the ball and socket members 13 and 14. This turning movement will continue as long as pressure is applied to the steering wheel 141, and when such pressure is released tension of the spring 144 pulls the arm 143 to a vertical position returning the steering wheel and also the valve members in the valve body 126 to neutral position whereby all flow to and from the hydraulic motor 122 is stopped. This leaves the axle housing 5 in the same position as it was when the steering wheel was released. The vehicle will continue on the same course until the steering wheel 141 is again moved as the double gear reduction in the unit 116 prevents any shocks on either of the wheels 7 from effecting any turning movement of the axle housing 5.

The power for this steering is in the hydraulic mechanism and gear reduction, thereby requiring very little effort on the part of the driver to steer the vehicle, and if desired suitable indicators may be provided to indicate the speed at which the axle housing 5 is being turned and also the relative angular direction of said axle housing and frame. The power turning of the axle housing 5 permits the vehicle to negotiate a curve of very short radius and also permits the front axle to be turned while the vehicle is stationary as when making a sharp turn at the corner of a field.

It is believed obvious that I have provided a motorized vehicle having a multiple number of axles in which all of the wheels are driven and in which one of the axles is steered with an ease of control on all types of terrain providing a flexibility of operation in a high traction vehicle.

What I claim and desire to secure by Letters Patent is:

1. A power steering mechanism for turning an axle of a motor vehicle having a chasis and said axle mounted on the chassis in spaced relation thereto for swinging and turning movement comprising, a gear reduction unit having a driving shaft and a vertically disposed driven shaft and mounted on the chassis with said driven shaft spaced from the axle mounting, telescoping means having one portion pivotally mounted on said driven shaft, means connecting the other portion of the telescoping means to the axle in spaced relation to the axle mounting, power means on the chassis and operatively connected to the driving shaft of the gear reduction unit for rotating the drive shaft thereof to swing the telescoping means and effect turning movement of the axle, and means on said chassis for controlling the direction and speed of operating of said power means.

2. A power steering mechanism for turning an axle of a motor vehicle having a chassis and said axle universally mounted on the chassis in spaced relation thereto for swinging and turning movement comprising, a universal joint connected with the axle in spaced relation to the universal mounting of said axle, a gear reduction unit having a driving shaft and a vertically disposed driven shaft and mounted on the chassis with said driven shaft spaced between the universal mounting of said axle and the universal joint, telescoping means having one portion pivotally mounted on said driven shaft and the other portion connected with the universal joint, power means on the chassis and operatively connected to the driving shaft of the gear reduction unit for rotating the drive shaft thereof to swing the telescoping means and effect turning movement of the axle housing, and means on said chassis for controlling the direction and speed of operation of said power means.

3. A power steering mechanism for turning an axle of a motor vehicle having a chassis and said axle universally mounted on the chassis in spaced relation thereto for supported swinging and turning movement comprising, a universal joint connected with the axle in spaced relation to the universal mounting of said axle, a power shaft mounted on the chassis for rotation about a vertical axis between the universal joint and the universal mounting of the axle, telescoping means having one portion pivoted on the power shaft and the other portion connected with the universal joint, a motor on the chassis, a speed reducing mechanism on said chassis operatively connecting the motor and power shaft, and means on said chassis for controlling operation of the motor and direction of rotation thereof in driving the power shaft to effect controlled directional turning of the axle.

4. A power steering mechanism for turning an axle of a motor vehicle having a chassis and said axle universally mounted on the chassis in spaced relation thereto for supported swinging and turning movement comprising, a universal joint connected with the axle in spaced relation to the universal mounting of said axle, a power shaft mounted on the chassis for rotation about a vertical axis between the universal joint and the universal mounting of the axle, telescoping means having one portion pivoted on the power shaft and the other portion connected with the universal joint, a fluid motor on said chassis, a speed reducing mechanism on said chassis operatively connecting the fluid motor and power shaft, a source of fluid pressure, a valve on said chassis for controlling application of the fluid pressure to the fluid motor to thereby alter the direction of rotation of said motor whereby controlled directional turning of the axle is effected, and means on said chassis for actuating the valve to stop operation of the motor in response to turning of the axle to a predetermined limit.

5. A power steering mechanism for turning an axle of a motor vehicle having a chassis and said axle universally mounted on the chassis for swinging and turning movement about the axis through the universal mounting comprising, a gear reduction unit having a driving shaft and a vertically disposed driven shaft and mounted on the chassis with said driven shaft spaced from the universal mounting of the axle, telescoping means having one portion hinged on said driven shaft, means universally connecting the other portion of the telescoping means with the axle in spaced relation to the axes of the driven shaft and the universal mounting of the axle whereby turning of the driven shaft turns the axle about an axis extending through the universal mounting of the axle, an hydraulic motor on said chassis and operatively connected to the driving shaft of the gear reduction unit for rotating the driven shaft thereof to swing the telescoping means and effect turning movement of the axle, a pump on said chassis for supplying fluid under pressure, means on said chassis for controlling the application of fluid pressure to the hydraulic motor and thereby effecting the direction of rotation of said motor whereby the direction of turning of the axle is controlled, and limit means associated with and operating in response to turning of the axle for stopping operation of the motor.

FRED P. MARTIN.

REFERENCES CITED

The following references are of record in the file of this patent:

UNITED STATES PATENTS

| Number | Name | Date |
| --- | --- | --- |
| 810,261 | Cantelou | Jan. 16, 1906 |
| 885,014 | Brightmore | Apr. 21, 1908 |
| 1,076,052 | Morton | Oct. 21, 1913 |
| 1,274,434 | Morton | Aug. 6, 1918 |
| 1,323,890 | Manly | Dec. 2, 1919 |
| 1,371,641 | Morton | Mar. 15, 1921 |
| 1,376,286 | Lingard | Apr. 26, 1921 |
| 1,447,073 | Gore | Feb. 27, 1923 |
| 1,457,692 | Carter | June 5, 1923 |
| 2,268,465 | Townsend | Dec. 30, 1941 |
| 2,308,351 | Blagden et al. | Jan. 12, 1943 |
| 2,464,110 | Wright | Mar. 8, 1949 |